Patented Nov. 11, 1952

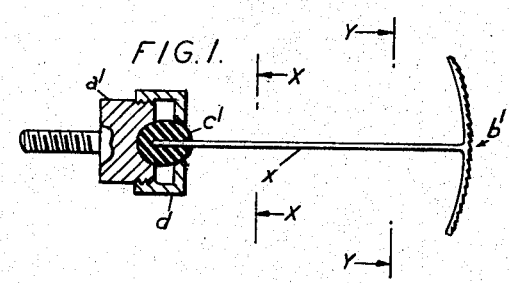
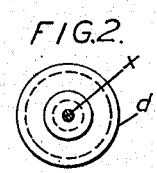
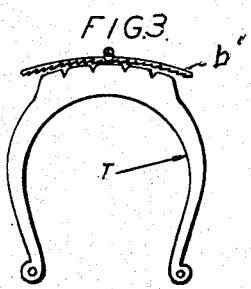
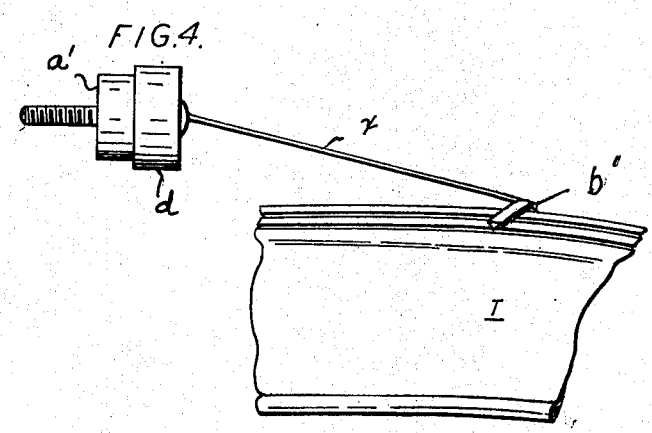

2,617,663

UNITED STATES PATENT OFFICE 2,617,663

TIRE PROTECTING DEVICE

William Charles Carlton, Hornchurch, England

Application December 15, 1948, Serial No. 65,342
In Great Britain June 25, 1946

1 Claim. (Cl. 280—158)

The present invention relates to means for protecting the tyres of vehicles.

The object of the present invention is to provide a simple and cheap tyre protecting apparatus particularly suitable for light vehicles although its use may not be confined to them.

To meet the above objects I provide a tyre protecting apparatus having an extractor of rigid or semirigid material, or the supporting arm or arms therefor mounted upon a body or bodies of non-metallic material which will yieldingly maintain the extractor in normal operative position close to or touching the tyre surface.

The material employed as a connection between the extractor and the pick-up point on the vehicle is preferably a resilient plastic such as polyvinyl chloride but rubber or leather can also be employed.

The connection between the connecting material and the extractor and between the connecting material and the main pick up point or points on the vehicle is such that if the extractor is moved away from the tyre surface when in normal operative position the connecting material will tend to force the extractor towards the tyre surface.

In a further feature of the invention means are provided for easily adjusting the resistance to movement of the extractor, and for increasing the strength of the joint by making solid reinforcement under severe compression load.

In one example given means are provided of adjusting the extractor relative to the tyre surface.

To enable the invention to be clearly understood and carried into effect three constructional forms thereof will now be described with reference to the accompanying drawings in which:

Fig. 1 is a part sectional plan view of one form of the device.

Fig. 2 is a view at XX of Fig. 1.

Fig. 3 is a view at YY of Fig. 1 also showing the relative position of the tyre.

Fig. 4 is a side elevation of the device shown in Fig. 1.

$a'$ is a metal cup in which is embodied a threaded stem by which means the device is secured to a convenient point on the vehicle. $c'$ is a sphere of rubber having a hole in it into which the steel rod X fits very tightly. $d$ is a metal cap which screws onto $a'$ and in so doing secures and compresses $c'$. The more $d$ is screwed home the more restricted is the movement of X and therefore the more restricted is the movement of $b'$, the extractor, which in this instance is a steel bar having serrations cut in its edge and is welded to X.

It will be seen from Fig. 3 that the extractor may rest on the tyre surface and in Fig. 4 it may be seen that the extractor $b'$ may be secured so that it is at an angle other than 90° to the tyre surface. In both Figs. 3 and 4 T represents the tyre. By loosening $d$ the correct adjustment of $b'$ may be made and when $d$ is tightened up again $b'$ will return to its correct position after deflection.

Although the extractors $b'$ are shown in the drawings in proportions suitable for their manufacture in steel nevertheless by increasing their size they could be made as a moulding in such material as polyvinyl chloride and would then become a semirigid extractor. A moulding could then be made which would incorporate the extractor and the connectors as one unit and developed further the connectors could be produced to embed an already existing part of the vehicle in a convenient position.

Polyvinyl chloride connections made in mixes which return slowly to the normal position after deflection would be dampers and would therefore additionally come within the scope of one of my earlier applications such as that resulting in Patent No. 2,585,914.

I claim:

A device for protecting a tire mounted on a vehicle wheel, comprising a metal cup member, means for attaching said cup member to the vehicle, an extractor member having an arm portion extending therefrom, a resilient plastic sphere in said cup member, said sphere having a hole therein in which the end of the arm portion of said extractor member is positioned, a metal cap member for retaining said plastic sphere in said cup member, said plastic sphere yieldingly maintaining the extractor member in normal operative relation to the tire surface while permitting displacement of the extractor member relatively to the tire surface by the forces applied thereto as the tire rotates, and means for compressing said resilient plastic sphere to vary the resistance of said sphere to movement of said extractor member.

WILLIAM CHARLES CARLTON.

REFERENCES CITED

The following references are of record in the file of this patent:

UNITED STATES PATENTS

| Number | Name | Date |
|---|---|---|
| 1,646,427 | Skidmore | Oct. 25, 1927 |
| 2,361,496 | Pointer | Oct. 31, 1944 |
| 2,407,473 | Carlton | Sept. 10, 1946 |
| 2,448,962 | D'Ardenne | Sept. 7, 1948 |

FOREIGN PATENTS

| Number | Country | Date |
|---|---|---|
| 4,381 | Great Britain | June 25, 1914 |
| 86,501 | Switzerland | Sept. 1, 1920 |
| 245,230 | Great Britain | Jan. 7, 1926 |
| 329,160 | Germany | Nov. 15, 1920 |

OTHER REFERENCES

Periodical: Ind. & Eng. Chemistry, August 1939, pp. 964–968.